(12) United States Patent
Kim et al.

(10) Patent No.: US 7,738,490 B2
(45) Date of Patent: Jun. 15, 2010

(54) METHOD AND SYSTEM FOR FAIRLY ALLOCATING DIFFERENTIATED BANDWIDTH BASED ON SHARED MULTICAST TRAFFIC IN TIME DIVISION MULTIPLEXED PASSIVE OPTICAL NETWORK

(75) Inventors: Nam-Uk Kim, Yousung-gu (KR); Min-Ho Kang, Seocho-gu (KR)

(73) Assignee: Research and Industrial Cooperation Group, Daejeon-shi (KR)

( * ) Notice: Subject to any disclaimer, the term of this patent is extended or adjusted under 35 U.S.C. 154(b) by 683 days.

(21) Appl. No.: 11/651,767

(22) Filed: Jan. 10, 2007

(65) Prior Publication Data

US 2007/0274339 A1    Nov. 29, 2007

(30) Foreign Application Priority Data

May 23, 2006    (KR) .................... 10-2006-0045997

(51) Int. Cl.
  $H04J\ 3/16$   (2006.01)
  $H04J\ 14/00$  (2006.01)
  $H04J\ 14/08$  (2006.01)

(52) U.S. Cl. .......................... 370/468; 398/66; 398/99

(58) Field of Classification Search .............. 370/230.1, 370/232–234, 252–253, 389–391, 395.4, 370/400–401, 432, 442, 468; 709/232–233, 709/238; 398/57, 59, 66, 74–75, 98–99

See application file for complete search history.

(56) References Cited

U.S. PATENT DOCUMENTS 6,771,599 B1 *   8/2004   Aoyama et al. ............ 370/230
7,209,443 B2 *   4/2007   Mukai et al. ............... 370/235
2002/0196491 A1 * 12/2002  Deng et al. ................. 359/124
2007/0071031 A1 *  3/2007   Shin et al. .................. 370/468
2007/0263625 A1 * 11/2007  Engstrand .................. 370/390
2008/0056275 A1 *  3/2008   Smiljanic ............... 370/395.41

OTHER PUBLICATIONS

Kramer et al., "Ethernet Passive Optical Network (EPON): Building a Next-Generation Optical Access Network", IEEE Communications Magazine, Feb. 2002, pp. 66-73.

\* cited by examiner

*Primary Examiner*—Aung S Moe
*Assistant Examiner*—Redentor M Pasia
(74) *Attorney, Agent, or Firm*—The Webb Law Firm

(57) ABSTRACT

A method for fairly allocating a differentiated bandwidth based on shared multicast traffic in transmission of downstream traffic in a Time Division Multiplexed-Passive Optical Network (TDM-PON) is provided. The method includes the steps of: deciding a total number of multicast groups to which services are currently provided, and a number of multicast groups to which a predetermined optical network unit (ONU) subscribes; calculating a multicast share degree in each of the multicast groups, and a total multicast share degree of the predetermined ONU in all of the multicast groups; dividing the total multicast share degree of the predetermined ONU by the total number of multicast groups to calculate a final normalized multicast share degree of the predetermined ONU; calculating an average multicast bandwidth of the predetermined ONU depending on a total bandwidth allocated to multicast traffic services on the basis of the final normalized multicast share degree; calculating the differentiated bandwidth of the predetermined ONU using ONU-specific service weights; and subtracting the average multicast bandwidth from the differentiated bandwidth of the predetermined ONU to calculate a maximum dynamic timeslot bandwidth of the predetermined ONU.

14 Claims, 4 Drawing Sheets

US 7,738,490 B2

METHOD AND SYSTEM FOR FAIRLY ALLOCATING DIFFERENTIATED BANDWIDTH BASED ON SHARED MULTICAST TRAFFIC IN TIME DIVISION MULTIPLEXED PASSIVE OPTICAL NETWORK

BACKGROUND OF THE INVENTION

1. Field of the Invention

The present invention relates to a time division MULTI-PLEXED passive optical network, and more particularly, to a method and system for fairly allocating a differentiated bandwidth based on shared multicast traffic in the transmission of downstream traffic from an optical line terminal (OLT) to an optical network unit (ONU).

2. Description of the Related Art

Due to ongoing growth of video-based applications requiring real-time data transmission and provision of integrated communication and broadcasting service, the total amount of Internet traffic has been rapidly increasing. In order to efficiently cope with this traffic increase, network providers apply Wavelength Division Multiplexing (WDM) technology to inter-city backbone networks and metro networks, thereby continuously increasing their transmission bandwidths.

In contrast, subscriber networks, in which the traffic transmitted from the backbone networks is distributed to end subscribers, have used conventional transmission technology based on Very-high-data-rate Digital Subscriber Line (VDSL) and cable modem together with high-speed Ethernet based technology. These subscriber network technologies can be deployed only in short distance area, and narrow transmission bandwidth is a basic bottleneck to provide the integrated services that are intensively discussed at present. In order to solve this problem, optical subscriber network technologies are being actively developed. The optical subscriber network technologies are directed to efficiently providing end subscribers with the transmission bandwidths required for the integrated services.

These optical subscriber network technologies include Time Division Multiplexed-Passive Optical Network (TDM-PON) technology and Wavelength Division Multiplexed-Passive Optical Network (WDM-PON) technology. The TDM-PON has a point-to-multipoint structure in which an optical line terminal (OLT) is connected with a plurality of optical network units (ONUs) through a passive optical splitter (POS), and a single transmission wavelength is shared with the plurality of ONUs in an optical layer. In the TDM-PON, downstream data transmission is carried out by TDM, while upstream data transmission is carried out by Time Division Multiple Access (TDMA) based on bandwidth reservation.

Unlike the TDM-PON, the WDM-PON has a logical point-to-point structure in which an individual transmission wavelength is allocated to each ONU. Data transmission between the OLT and the ONUs is independently performed without a time division process. Accordingly, the WDM-PON can provide subscribers with wider transmission bandwidths.

However, the deployment cost of WDM-PON is still high due to an expensive transmission system and optical devices, and thus it is predicted to take some time before it can be put to practical use. In contrast, the TDM-PON can make efficient use of the same wavelength through time division, and furthermore requires relatively inexpensive equipment. Thus, the TDM-PON has drawn attention as next-generation optical subscriber network technology.

According to a framing and multiplexing method of the data link layer, TDM-PON technology can be divided into E-PON, G-PON, and B-PON technology, all of which have the same basic up/downstream transmission control concept. First, in the case of upstream transmission, because the data transmission from a plurality of ONUs and Optical Network Terminals (ONTs) to an OLT, a common destination, is performed through a shared link, a proper Multiple Access Control (MAC) technique is required in order to prevent data collision. To this end, the ONUs and ONTs generally reserve the bandwidth of transmission window required for the next transmission period on the basis of the total amount of data stored in buffers, and the OLT arbitrates this reservation and then allocates a transmission timeslot, i.e., an upstream bandwidth. Hence, it is possible to maintain high network efficiency, and fairly allocate bandwidth to the ONUs as well. At this time, due to point-to-point communication in which the primary destination of a data frame transmitted from each ONU for a timeslot period of time is the OLT, which means no multicast traffic exist in TDM-PON area, it is possible to easily maintain fairness of the bandwidth allocation by controlling the timeslot size.

Unlike upstream transmission, downstream transmission is performed as follows. All data frames transmitted from the OLT are split in the optical layer through the POS and then broadcasted to all of the ONUs and ONTs. Each ONU filters the broadcast frames to receive only necessary frames on the basis of a destination address in a MAC layer. At this time, if all traffic is unicast traffic, i.e., frames directed to only a single destination, similar to upstream transmission, the OLT can allocate downstream transmission bandwidth to ONUs fairly by controlling timeslot size of ONU.

However, in practice, in the case of downstream transmission in the TDM-PON, there is always a large amount of multicast traffic due to multicast Video On Demand (VOD) and broadcasting video service, and this multicast traffic is simultaneously shared with the numerous ONUs through OPS. As such, in the case of downstream transmission, when the transmission timeslots are merely allocated in a uniform way, it is impossible to guarantee fair allocation of bandwidth.

SUMMARY OF THE INVENTION

It is, therefore, an objective of the present invention to provide a method and system for fairly allocating a differentiated bandwidth based on shared multicast traffic in transmission of downstream traffic in a Time Division Multiplexed-Passive Optical Network (TDM-PON), capable of allocating a differentiated dynamic timeslot bandwidth to each optical network unit (ONU) on the basis of ONU-specific multicast traffic share degrees and ONU-specific service weights.

According to one aspect of the present invention, there is provided a method for fairly allocating a differentiated bandwidth based on shared multicast traffic in the transmission of downstream traffic in a TDM-PON, the method comprising the steps of: a) deciding a total number of multicast groups to which services are currently provided, and a number of multicast groups to which a predetermined optical network unit (ONU) subscribes; b) calculating a multicast share degree in each of the multicast groups, and a total multicast share degree of the predetermined ONU in all of the multicast groups; c) dividing the total multicast share degree of the predetermined ONU by the total number of multicast groups to calculate a final normalized multicast share degree of the predetermined ONU; d) calculating an average multicast bandwidth of the predetermined ONU depending on a total bandwidth allocated to multicast traffic services on the basis of the final normalized multicast share degree; e) calculating the differentiated bandwidth of the predetermined ONU using ONU-specific service weights; and f) subtracting the average multicast bandwidth from the differentiated bandwidth of the predetermined ONU to calculate a maximum dynamic timeslot bandwidth of the predetermined ONU.

Here, step b) may further comprise the steps of: deciding the multicast share degree in each of the multicast groups; taking a reciprocal of each multicast share degree in all of the multicast groups to which the predetermined ONU subscribes; and adding the reciprocals of all multicast share degrees.

Further, in step d), the average multicast bandwidth of the predetermined ONU may be calculated by multiplying the total bandwidth allocated to the multicast traffic services and the final normalized multicast share degree.

Also, in step e), the differentiated bandwidth of the predetermined ONU may be calculated by multiplying the total cycle bandwidth and a ratio of the service weight of the predetermined ONU depending on the sum of the service weights of all the ONUs.

According to another aspect of the present invention, there is provided a system for fairly allocating a differentiated bandwidth based on shared multicast traffic in the transmission of downstream traffic in a TDM-PON. The system comprises: a service weight table for recording a service weight of at least one ONU; a multicast share management block for calculating a final normalized multicast share degree of the ONU; a multicast traffic share table for recording the final normalized multicast share degree of the ONU; a timeslot arbitration block for calculating ONU-specific maximum dynamic timeslot bandwidths using information on a timeslot allocation bandwidth, information on ONU-specific service weights input from the service weight table, and the final normalized multicast share degree input from the multicast traffic share table; and a timeslot information block for transmitting the ONU-specific maximum dynamic timeslot bandwidths to a transmission controller block.

Here, the multicast share management block may be provided with information on multicast group, information on a total number of member ONUs that subscribe to a predetermined multicast group, and information on the ONUs that subscribe to the predetermined multicast group from a multicast management block of switch module. The timeslot allocation bandwidth information of the timeslot arbitration block may be input from a transmission queue manager block.

Further, the multicast share management block may: decide a total number of multicast groups to which services are currently provided, and a number of multicast groups to which the ONU subscribes; calculate a multicast share degree in each of the multicast groups, and a total multicast share degree of the ONU in all of the multicast groups; and divide the total multicast share degree of the ONU by the total number of multicast groups to calculate the final normalized multicast share degree of the ONU.

Also, the timeslot arbitration block may: calculate an average multicast bandwidth of the ONU depending on a total bandwidth allocated to multicast traffic services on the basis of the final normalized multicast share degree; calculate the differentiated bandwidth of the ONU using ONU-specific service weights; and subtract the average multicast bandwidth from the differentiated bandwidth of the ONU to calculate the maximum dynamic timeslot bandwidth of the ONU.

Meanwhile, the TDM-PON may include the plurality of ONUs, and at least one optical line terminal (OLT). The downstream traffic transmitted from the OLT to the individual ONU may be split by an optical splitter. Also, the downstream traffic transmitted from the OLT to the individual ONU may be operated in a TDM mode.

Therefore, the present invention decides the maximum dynamic timeslot bandwidth that can be allocated to each ONU according to the traffic share degree of the multicast group to which each ONU subscribes and the service weight of each ONU controlled by a manager at every downstream bandwidth allocation period of the OLT. Thus, the downstream timeslot is allocated and the downstream traffic is transmitted so that fair differentiated bandwidth allocation to each ONU can be firmly guaranteed.

BRIEF DESCRIPTION OF THE DRAWINGS

The above and other features and advantages of the present invention will become more apparent to those of ordinary skill in the art by describing in detail preferred embodiments thereof with reference to the attached drawings in which.

DETAILED DESCRIPTION OF THE INVENTION

The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. Like numbers refer to like elements throughout the specification and drawings.

Figure 1:
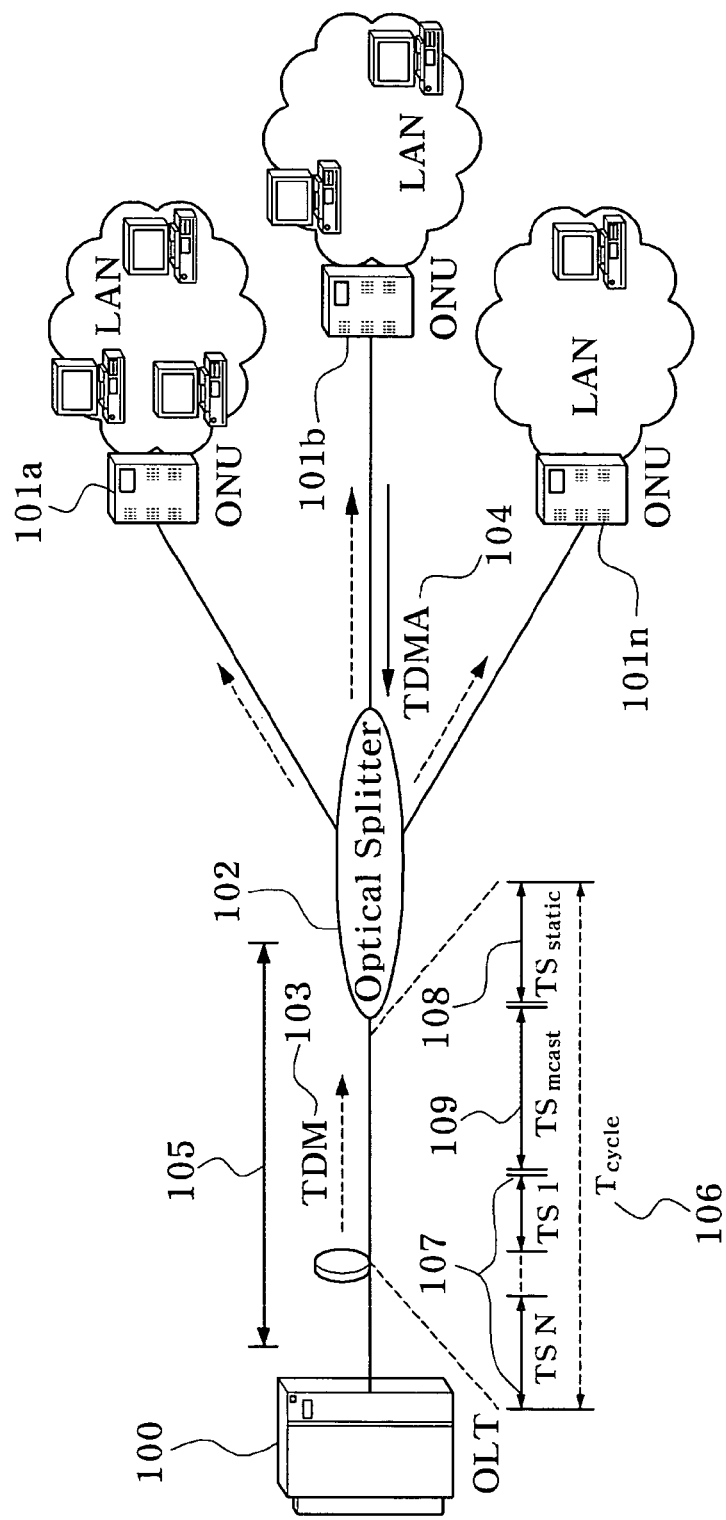
FIG. 1 illustrates the construction of a general fiber-to-the-curb (FTTC) type Time Division Multiplexed-Passive Optical Network (TDM-PON)

FIG. 1 illustrates the construction of a general fiber-to-the-curb (FTTC) type Time Division Multiplexed-Passive Optical Network (TDM-PON).

The TDM-PON is comprised of a plurality of optical network units (ONUs) $101a, 101b, \ldots, 101n$, and an optical line terminal (OLT) 100 for controlling downstream data transmission. Downstream traffic transmitted from the OLT 100 is split at an optical power splitter 102 and transmitted en bloc to all the ONUs $101a, 101b, \ldots, 101n$. The downstream traffic is divided into multicast traffic that should be delivered to numerous ONUs, and unicast traffic that should be delivered to an individual ONU.

Downstream data transmission from the OLT 100 to the plurality of ONUs $101a, 101b, \ldots, 101n$ is carried out in a TDM mode 103 in which data is broadcasted to all the ONUs $101a, 101b, \ldots, 101n$ through the optical power splitter 102 in the network and then filtered. In contrast, upstream data traffic transmission is controlled in a reservation-based Time Division Multiple Access (TDMA) mode 104 by bandwidth reservation of the ONU and bandwidth allocation of the OLT. A common link between the OLT 100 and the optical splitter 102 is a long-distance link 105 having a maximum distance of about 15 km. Logically, downstream transmission has a point-to-multipoint structure, while upstream transmission has a point-to-point structure. Because each ONU is provided with a transceiver module for full duplex communication, upstream data transmission is carried out independently of downstream data transmission.

Downstream data transmission is based on a periodical transmission cycle $T_{cycle}$ 106 and an internal timeslot (TS) Each transmission cycle is composed of a timeslot $TS_{static}$ 108 for a constant bit rate static traffic transmission service, a timeslot $TS_{mcast}$ 109 for multicast traffic transmission, and dynamic timeslots TS1, . . . , TSN 107 for unicast traffic transmission. This periodical downstream traffic transmission can be implemented by batch packet scheduling, including a scheme of allocating an independent timeslot to each individual ONU's logical port, but the principle is the same.

With regard to downstream traffic transmission in the TDM-PON, the important performance factors that should be guaranteed are transmission efficiency, service efficiency, fair bandwidth allocation between ONUs, provision of controllable differentiated service between ONUs, and so on. The OLT can basically guarantee these performance factors by means of fair allocation of downstream timeslots. Differentiated service between unicast frames whose destination is the same ONU can be guaranteed by transmitting traffic, stored in a same logical ONU data buffer of the OLT, by means of the packet scheduling scheme based on pre-defined traffic priority. This feature of downstream data transmission is the same as upstream data transmission. Therefore, considering only ONU-specific unicast traffic, downstream timeslots are preferably allocated in proportion to a service weight prescribed for each ONU.

However, it is necessary for the multicast traffic to be processed at the OLT of the TDM-PON according to a scheme other than an existing packet switching scheme. In other words, even when the OLT transmits a single multicast data frame in a downstream direction, the single multicast frame should be capable of being transmitted to all the ONUs through the optical power splitter, and the ONUs requesting the multicast service should be capable of selectively receiving the multicast frame by means of filtering. Hence, in the case of downstream transmission in the TDM-PON, although the unicast traffic and the multicast traffic occupy the same downstream bandwidth, there is actually a considerable difference in allocated bandwidth per ONU. This stands in contrast with upstream transmission and is because the TDM-PON is determined to be attractive in providing broadcasting services. However, the existing multicast packet switching scheme may give rise to a problem in frame transmission. For example, there is a possibility of causing a problem upon multiple frame receiving, namely, that the same frame is repeatedly delivered to the same destination node.

In order to efficiently prevent this problem, it is necessary for the OLT to transmit the multicast traffic only once en bloc at a specific period of every transmission period. Thereby, it is possible to remarkably lower system complexity compared to the scheme of selectively processing the multicast traffic at the logical downstream transmission port of each ONU. In order to guarantee fair downstream bandwidth sharing, this multicast traffic sharing should be reflected in timeslot allocation to each ONU for unicast traffic transmission as well as allocation of the entire timeslot bandwidth. In other words, when a specific ONU has already received large multicast bandwidth by subscribing to a plurality of multicast services, the unicast bandwidth of the ONU should be determined by reflecting this prior allocation. Here, if the bandwidth used to transmit specific multicast stream is shared with all the ONUs subscribing to the corresponding multicast service, only the multicast transmission bandwidth actually allocated to each ONU should be considered. In contrast, when the specific ONU does not subscribe to any multicast service, the OLT should guarantee that ONU full bandwidth proportional to the service weight.

Figure 2:
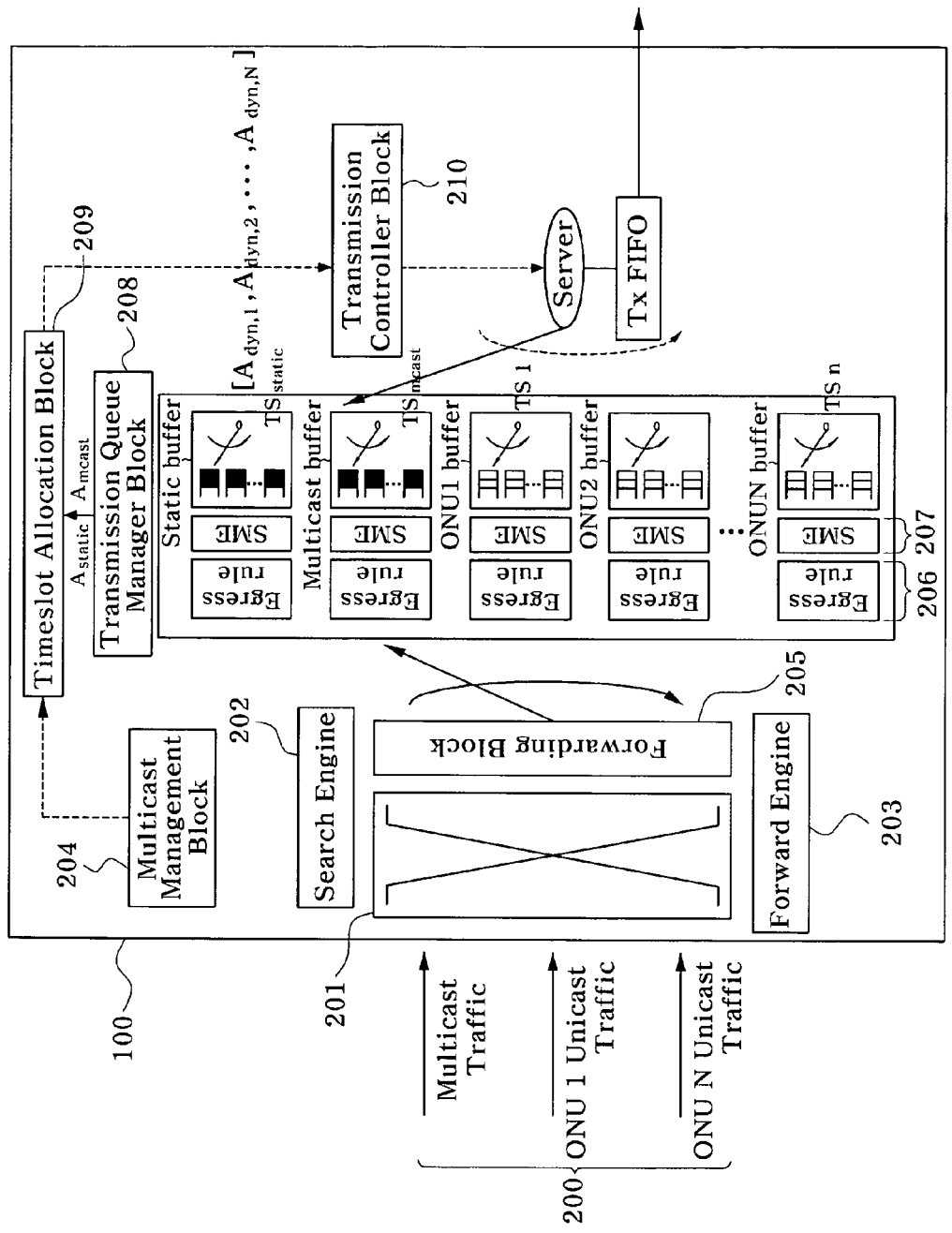
FIG. 2 is a block diagram illustrating operation of an OLT for downstream data transmission in a TDM-PON.

FIG. 2 is a block diagram illustrating operation of an OLT for downstream data transmission in a TDM-PON.

A variety of multicast and unicast traffic 200 is input into the OLT 100 in metro and backbone networks. Then, a switching module 201 of the OLT 100 switches the traffic by means of search and forward engines 202 and 203 according to a destination address and a data packet type.

Here, information about a multicast packet is maintained by a multicast management block 204 managed by the OLT. This maintenance is implemented by a Virtual Local Area Network (VLAN) function and an Internet Group Management Protocol function, both of which are basically provided by the commercial switch. Further, unlike a general packet switching scheme, the forward engine 203 does not duplicate the multicast packet, and merely notifies a forwarding block 205 that a packet is the multicast packet.

Then, the forwarding block 205 forwards a multicast data frame and a unicast frame to a designated downstream multicast buffer and a downstream unicast buffer for the individual ONU, respectively. Specifically, it is checked whether each of the frames matches a normalized transmission rule of the corresponding port by port-specific logical "egress rules" at port-specific "egress rule" blocks. Thereafter, a logical link identification (LLID) tag, which is required for downstream transmission at a shared media emulation (SME) block 207 for a point-to-point emulation, is attached in a pre-defined scheme according to the unicast and multicast. Here, the LLID has a somewhat different attaching scheme according to TDM-PON technology, but has the same basic purpose.

The data frames buffered in this manner are transmitted to the individual ONUs in the periodical data transmission mode adopting $T_{cycle}$ as a period, as previously suggested in FIG. 1. At this time, a $TS_{static}$ timeslot for T1E1 emulation for guaranteeing a quality of voice of a circuit telephone network level at every transmission period, and a $TS_{mcast}$ timeslot for the multicast traffic are allocated prior to other dynamic timeslots, and the corresponding traffic is transmitted. Information $A_{static}$ and $A_{mcast}$ on the total amounts of the static and multicast traffic transmitted in each timeslot at every period are informed from a transmission queue manager block 208 to a timeslot allocation block 209 in order to allocate the unicast dynamic timeslot to each ONU. Here, assuming that the total bandwidth of one transmission period is $A_{cycle}$, the total bandwidth $A_{dyn}+A_{mcast}$ capable of being dynamically allocated for the unicast and multicast traffic of the ONUs is $A_{cycle}-A_{static}$. On the basis of this service information, the timeslot allocation block 209 determines the maximum dynamic timeslot bandwidth $A_{dyn,j}$ of the individual ONU by means of an allocation algorithm, and then informs the transmission controller block 210 of this information.

Thus, the buffered unicast frames of each ONU buffer are serviced and transmitted by a packet scheduling algorithm pre-defined within the limit not exceeding the allocated maximum unicast timeslot bandwidth $A_{dyn,j}$. Here, if the total sum of sizes of frames stored in each ONU buffer is less than the maximum timeslot bandwidth, the TS of the corresponding ONU is terminated without standby after only currently accumulated frames are processed, and then the TS of the next ONU starts. This is a scheme for maintaining high efficiency in network transmission. Accordingly, the total amount of service $SW_j$ of the $ONU_j$ can be given by Equation 1 below.

$$SW_j = \min(Q_j, A_{dyn,j}) \quad \text{Equation 1}$$

where $Q_j$ is the total amount of buffered data.

Figure 3:
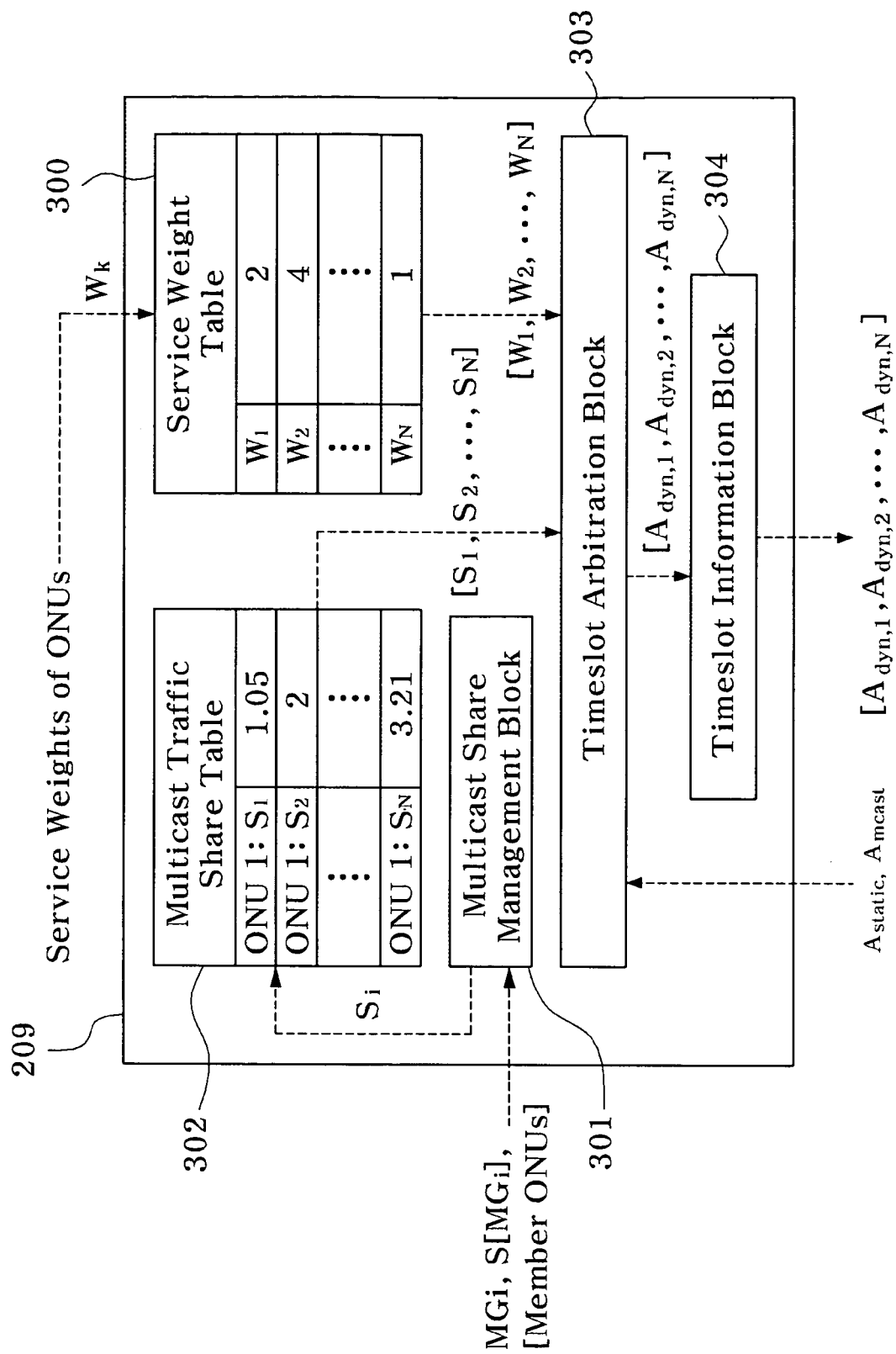
FIG. 3 is a block diagram illustrating a detailed construction of a timeslot allocation block of FIG. 2.

FIG. 3 is a block diagram illustrating a detailed construction of the timeslot allocation block 209 of FIG. 2.

The bandwidth allocation of the timeslot is directed to fairly allocate a differentiated bandwidth in a controllable manner. The final allocation of bandwidth to the ONU is carried out by a Share-based Fair Differentiated Bandwidth Allocation (S-FDBA) algorithm for multicast traffic proposed in the present invention.

First, a service weight of each ONU which is dynamically set by the network manager is recorded in a service weight table 300 in the form of a memory array.

When the information of the multicast management block 204 of FIG. 2 is changed due to ONU subscription to or withdrawal from multicast services, a multicast share management block 301 updates information of a multicast traffic share table by reflecting this change. In other words, the multicast management block 204 of the OLT provides the multicast share management block 301 with a multicast group MGi, a multicast share degree of the corresponding multicast, i.e., the total number S[MGi] of subscriber ONUs, and information [Member ONUs] of the ONUs that subscribe to the corresponding group. The multicast share management block 301 calculates the multicast share degree of each ONU by means of a proposed share-based proportion bandwidth allocation algorithm on the basis of these pieces of information, and then records the resulting information in a multicast traffic share table 302.

A timeslot arbitration block 303 calculates ONU-specific maximum dynamic timeslot bandwidths $A_{dyn,1}, A_{dyn,2}, \ldots, A_{dyn,N}$ by a timeslot allocation scheme of the S-FDBA using information on timeslot allocation bandwidths $A_{static}$ and $A_{mcast}$ input from the transmission queue manager block 208, information on ONU-specific service weights $W_1, W_2, \ldots, W_N$ input from a service weight table 300, and information on mulicast traffic share degrees $S_1, S_2, \ldots, SN$ input from the multicast traffic share table 302. The calculated maximum dynamic timeslot bandwidths $A_{dyn,1}, A_{dyn,2}, \ldots, A_{dyn,N}$ are transmitted to the transmission controller block 210 of the OLT of FIG. 2 through a timeslot information block 304 and are utilized for transmission of the data frames stored in the buffer of each ONU.

Figure 4:
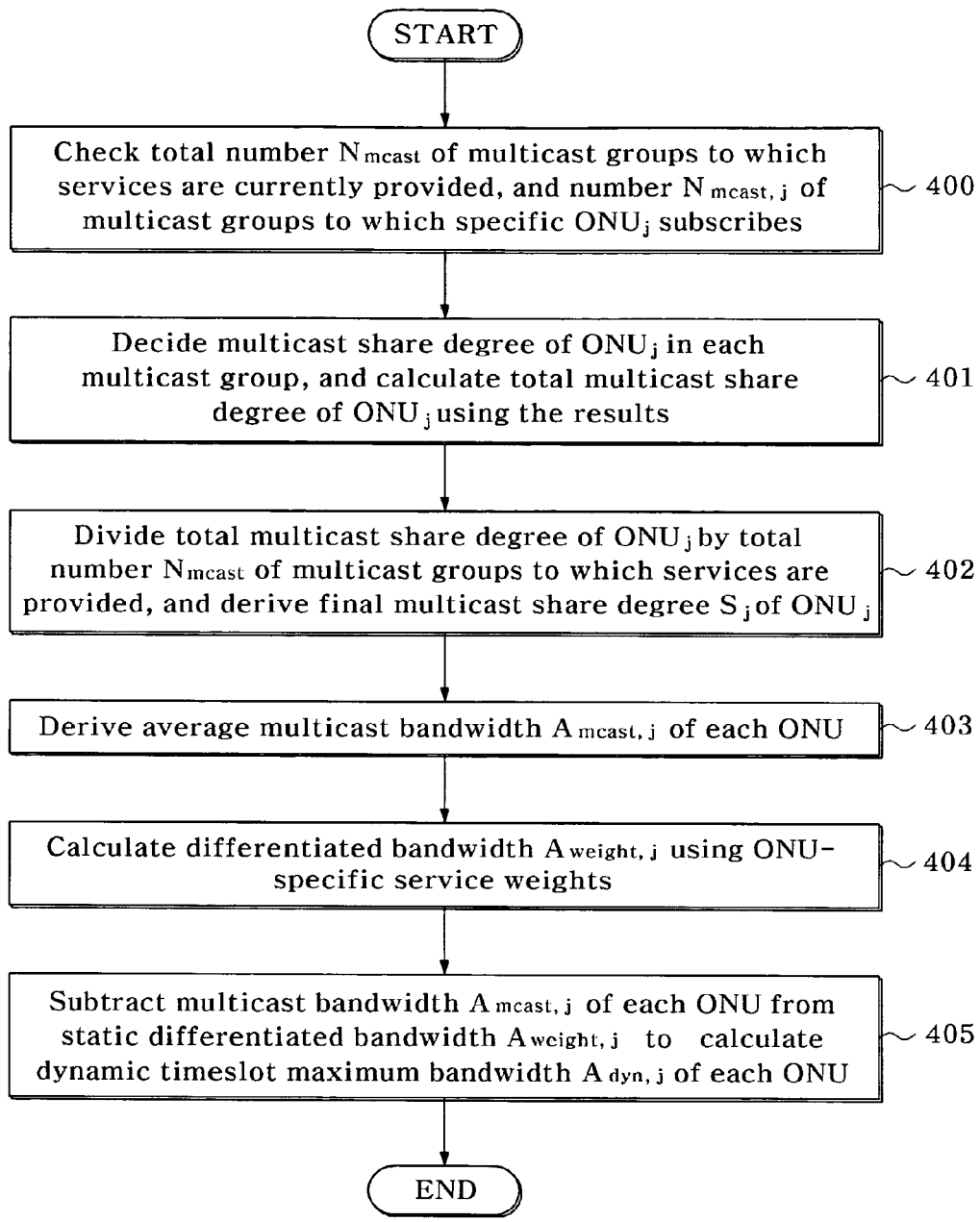
FIG. 4 is a flowchart illustrating a method for fairly allocating a differentiated bandwidth based on shared multicast traffic in accordance with an exemplary embodiment of the present invention.

FIG. 4 is a flowchart illustrating a method for fairly allocating a differentiated bandwidth based on shared multicast traffic in accordance with an exemplary embodiment of the present invention.

First, the multicast share management block 301 decides the total number $N_{mcast}$ of multicast groups to which services are currently provided on the basis of information provided at the multicast management block 204, and the number $N_{mcast,j}$ of multicast groups to which a specific $ONU_j$ subscribes (S400).

Thereafter, the multicast share management block 301 decides a multicast share degree of the $ONU_j$ in each multicast group, and calculates the total multicast share degree of the $ONU_j$ using the decided multicast share degree (S401). This calculation is a process of detecting a bandwidth allocated in a multicast timeslot according to each ONU, and is obtained through the share degree $S[MG_j]$ of the multicast group which is informed from the multicast management block 204.

For example, if m number of ONUs subscribe to a specific multicast group, the multicast share degree of the group is m. This means that a bandwidth is allocated to each member ONU at a ratio of 1/m of a multicast transmission bandwidth required for the corresponding multicast service. Therefore, the multicast share management block 301 calculates the total multicast share degree of the $ONU_j$ by summing the reciprocal of the share degree of the $N_{mcast,j}$ multicast groups to which the $ONU_j$ subscribes.

Then, the total multicast share degree of the $ONU_j$ is divided by the total number $N_{mcast}$ of multicast groups, and thereby an average ratio of the multicast traffic bandwidth allocated to the $ONU_j$ at every transmission period, namely a final normalized multicast share degree $S_j$ of the $ONU_j$, is derived (S402). Through this process, the final multicast share degree $S_j$ can be found as in Equation 2 below.

$$S_j = \frac{1}{N_{mcast}(t)} \sum_{k=1}^{N_{mcast,j}(t)} \frac{1}{S_k} \quad \text{Equation 2}$$

When the total bandwidth $A_{mcast}$ allocated to the multicast traffic services on the basis of this multicast traffic share degree, the timeslot arbitration block 303 can derive average multicast bandwidths $A_{mcast,j}$ of each ONU as in Equation 3 below.

$$A_{mcast,j} = A_{mcast} \cdot S_j = A_{mcast} \cdot \frac{1}{N_{mcast}(t)} \sum_{k=1}^{N_{mcast,j}(t)} \frac{1}{S_k} \quad \text{Equation 3}$$

At this time, if various types of multicast services having different average frame sizes are provided at the same time, the multicast bandwidth given by Equation 3 is derived according to a multicast service type to which the ONU belongs, and applied to calculation of a unicast timeslot value.

In addition, the timeslot arbitration block 303 calculates a maximum allocable differentiated bandwidth $A_{weight,j}$ of each ONU using ONU-specific service weights which the network manager dynamically sets, as in Equation 4 below (S404).

$$A_{weight,j} = (A_{cycle} - A_{static}) \cdot \frac{W_j}{\sum_{i=1}^{N} W_i} \quad \text{Equation 4}$$

Because the differentiated bandwidth $A_{weight,j}$ is the maximum value of the ONU-specific downstream bandwidths which the network manager sets regardless of the traffic type, the S-FDBA algorithm allocates a unicast timeslot bandwidth by subtracting the multicast bandwidth $A_{mcast,j}$ of each ONU of Equation 3 from the static differentiated bandwidth $A_{weight,j}$ of Equation 4, as a dynamic timeslot maximum bandwidth $A_{dyn,j}$ of each ONU, in order to fairly allocate proportion bandwidth (S405). Thus, the determined maximum dynamic timeslot bandwidth $A_{dyn,j}$ of each ONU is as in Equation 5.

$$A_{dyn,j} = (A_{cycle} - A_{static}) \cdot \frac{W_j}{\sum_{i=1}^{N} W_i} - A_{mcast} \cdot \frac{1}{N_{mcast}(t)} \sum_{k=1}^{N_{mcast,j}(t)} \frac{1}{S_k} \quad \text{Equation 5}$$

In this manner, the decided ONU-specific $A_{dyn,j}$ information is transmitted to the transmission controller block 210 of the OLT and used as a reference for the frame transmission of each ONU by the scheme described in Equation 1 above. Therefore, the entire ONU-specific transmission bandwidths required for the multicast and unicast traffic transmission are always constantly maintained in proportion to the service weight which the network manager designates by means of the S-FDBA algorithm.

As described above, according to the present invention, the traffic share degree of each ONU is derived on the basis of the shared multicast traffic, and the bandwidth is differently allocated on the basis of the service weight. This has the following effects in view of TDM-PON performance.

First, the multicast traffic is independently transmitted through allocation of the multicast buffer and the independent multicast timeslot, so that the multicast services can be efficiently provided in the downstream direction of the TDM-PON. The bandwidth required for the multicast traffic transmission and the multicast packet processing burden of the OLT are minimized, so that it is possible to maintain high network transmission efficiency.

Second, the multicast bandwidth that is actually allocated to the individual ONU is efficiently derived and reflected in allocation of the entire bandwidths, so that it is possible to prevent any one ONU from monopolizing a large bandwidth through the multicast services.

Third, the information of the multicast group which is required to calculate the multicast share degree is easily obtained based on the multicast information managed and maintained in order to support the multicast services at the existing commercial switch, so that it is possible to change the system to the minimum extent.

Fourth, the service weight of each ONU is controlled by the network manager, so that the ONU-specific differentiated services can be dynamically controlled by the manager when the bandwidth is allocated. This enables more efficient network management and service provision.

Fifth, the plurality of multicast services are efficiently provided through a scheme of adaptively controlling the size of the dynamic timeslot allocation bandwidth according to change in multicast and unicast traffic services of the subscriber, and simultaneously, the overall proportion of bandwidths set by the manager is always maintained, so that fair bandwidth allocation and efficient differentiated service are continuously carried out between ONUs.

Although exemplary embodiments of the present invention have been described for illustrative purposes, it will be apparent to those skilled in the art that various modifications, additions and substitutions are possible, without departing from the scope and spirit of the invention as disclosed in the accompanying claims.

What is claimed is:

1. A method for fairly allocating a differentiated bandwidth based on shared multicast traffic in the transmission of downstream traffic in a Time Division Multiplexed-Passive Optical Network (TDM-PON), the method comprising the steps of:
    a) providing the TDM-PON comprised of a plurality of optical network units (ONUs) and an optical line terminal (OLT) for controlling downstream data transmission;
    b) deciding a total number of multicast groups to which services are currently provided, and a number of multicast groups to which a predetermined ONU subscribes by a multicast share management block of a timeslot allocation block of the OLT;
    c) calculating a multicast share degree in each of the multicast groups, and a total multicast share degree of the predetermined ONU in all of the multicast groups by the multicast share management block;
    d) dividing the total multicast share degree of the predetermined ONU by the total number of multicast groups to calculate a final normalized multicast share degree of the predetermined ONU by the multicast share management block;
    e) calculating an average multicast bandwidth of the predetermined ONU depending on a total bandwidth allocated to multicast traffic services on the basis of the final normalized multicast share degree by a timeslot arbitration block of the timeslot allocation block of the OLT;
    f) calculating a differentiated bandwidth of the predetermined ONU using ONU-specific service weights by the timeslot arbitration block; and
    g) subtracting the average multicast bandwidth from the differentiated bandwidth of the predetermined ONU to calculate a maximum dynamic timeslot bandwidth of the predetermined ONU by the timeslot arbitration block.

2. The method according to claim 1, wherein step c) further comprises the steps of:
    deciding the multicast share degree in each of the multicast groups;
    taking a reciprocal of each multicast share degree in all of the multicast groups to which the predetermined ONU subscribes; and
    adding the reciprocals of all multicast share degrees.

3. The method according to claim 1, wherein, in step e), the average multicast bandwidth of the predetermined ONU is calculated by multiplying the total bandwidth allocated to the multicast traffic services and the final normalized multicast share degree.

4. The method according to claim 1, wherein in step f), the differentiated bandwidth of the predetermined ONU is calculated by multiplying the total bandwidth allocated to the multicast traffic services and a ratio of the service weight of the predetermined ONU depending on the sum of the service weights of all the ONUs.

5. The method according to claim 1, wherein, when a total amount of frames stored in a predetermined ONU buffer is less than the maximum dynamic timeslot bandwidth of the predetermined ONU, a timeslot of the predetermined ONU is terminated without a standby after only currently accumulated frames are processed.

6. A system for fairly allocating a differentiated bandwidth based on shared multicast traffic in the transmission of downstream traffic in a Time Division Multiplexed-Passive Optical Network (TDM-PON), the system comprising:
    a service weight table for recording a service weight of at least one optical network unit (ONU);
    a multicast share management block for calculating a final multicast share degree of the ONU;
    a multicast traffic share table for recording the final multicast share degree of the ONU;
    a timeslot arbitration block for calculating ONU-specific maximum dynamic timeslot bandwidths using information on a timeslot allocation bandwidth, information on ONU-specific service weights input from the multicast traffic share table, and the final multicast share degree input from the multicast traffic share table; and
    a timeslot information block for transmitting the ONU-specific maximum dynamic timeslot bandwidths to a transmission controller block,
    wherein the timeslot arbitration block: calculates an average multicast bandwidth of the ONU depending on a total bandwidth allocated to multicast traffic services on the basis of the final multicast share degree; calculates the differentiated bandwidth of the ONU using ONU-specific service weights; and subtracts the average multicast bandwidth from the differentiated bandwidth of the ONU to calculate the maximum dynamic timeslot bandwidth of the ONU.

7. The system according to claim 6, wherein the multicast share management block is provided with information from a multicast management block on multicast group, a total number of member ONUs that subscribe to a predetermined multicast group, and the ONUs that subscribe to the predetermined multicast group.

8. The system according to claim 6, wherein the timeslot allocation bandwidth information of the timeslot arbitration block is input from a transmission queue manager block.

9. The system according to claim 6, wherein the multicast share management block: decides a total number of multicast groups to which services are currently provided, and a number of multicast groups to which the ONU subscribes; calculates a multicast share degree in each of the multicast groups, and a total multicast share degree of the ONU in all of the multicast groups; and divides the total multicast share degree of the ONU by the total number of multicast groups to calculate the final normalized multicast share degree of the ONU.

10. The system according to claim 6, wherein the TDM-PON includes the plurality of multicast member ONUs and at least one optical line terminal (OLT).

11. The system according to claim 10, wherein the downstream traffic transmitted from the OLT to the individual ONU is split by an optical power splitter.

12. The system according to claim 11, wherein the downstream traffic transmitted from the OLT to the individual ONU is operated in a TDM mode.

13. The system according to claim 6, wherein the transmission controller block terminates a timeslot of the predetermined ONU without a standby after processing only currently accumulated frames, when a total amount of frames stored in a predetermined ONU buffer is less than the maximum dynamic timeslot bandwidth of the predetermined ONU.

14. The system according to claim 6, further comprising a static data buffer, a multicast data buffer, and ONU-specific data buffers in order to efficiently receive downstream multicast traffic, wherein individual traffic transmission is controlled through sequential timeslot bandwidth allocation.

* * * * *